(12) United States Patent  
Tiszai et al.

(10) Patent No.: US 8,689,679 B2
(45) Date of Patent: Apr. 8, 2014

(54) AUTOMATIC COOKING MEDIUM LEVEL CONTROL SYSTEMS AND METHODS

(75) Inventors: Joseph J. Tiszai, Fairfield, OH (US);
Robert T. Wood, Tipp City, OH (US);
Robert W. Stirling, Dayton, OH (US);
Gary L. Mercer, Eaton, OH (US);
Douglas A. Burkett, Eaton, OH (US);
Tim A. Landwehr, West Alexandria, OH (US)

(73) Assignee: Henny Penny Corporation, Eaton, OH (US)

( * ) Notice: Subject to any disclaimer, the term of this patent is extended or adjusted under 35 U.S.C. 154(b) by 680 days.

(21) Appl. No.: 11/563,656

(22) Filed: Nov. 27, 2006

(65) Prior Publication Data

US 2008/0121115 A1    May 29, 2008

(51) Int. Cl.
*A47J 37/12* (2006.01)

(52) U.S. Cl.
USPC ............................................. 99/334; 99/330

(58) Field of Classification Search
USPC ...................... 99/330, 334; 374/141; 219/494
See application file for complete search history.

(56) References Cited

U.S. PATENT DOCUMENTS

| | | | | |
|---|---|---|---|---|
| 1,646,337 A | * | 10/1927 | Allen | 116/109 |
| 3,701,313 A | * | 10/1972 | Boggs | 99/330 |
| 4,031,355 A | * | 6/1977 | Leonik, Jr. | 219/502 |
| 4,050,447 A | * | 9/1977 | Terracciano | 126/374.1 |
| 4,353,293 A | * | 10/1982 | Illy | 99/283 |
| 4,502,373 A |  | 3/1985 | Keating | |
| 4,722,267 A | * | 2/1988 | Galockin et al. | 99/357 |
| 4,968,516 A | * | 11/1990 | Thompson | 426/233 |
| 5,472,721 A | * | 12/1995 | Eisenberg et al. | 426/243 |
| 5,539,185 A | * | 7/1996 | Polster | 219/439 |
| 5,586,486 A | * | 12/1996 | Nitschke et al. | 99/330 |
| 5,617,777 A |  | 4/1997 | Davis et al. | |
| 5,665,412 A | * | 9/1997 | Fuller et al. | 426/524 |
| 5,776,530 A |  | 7/1998 | Davis et al. | |
| 6,057,772 A | * | 5/2000 | Burkett | 340/612 |
| 6,715,643 B1 | * | 4/2004 | Kelly | 222/82 |
| 6,762,671 B2 | * | 7/2004 | Nelson | 338/25 |
| 2006/0130670 A1 |  | 6/2006 | Johnson et al. | |

* cited by examiner

*Primary Examiner* — Dana Ross
*Assistant Examiner* — John Wasaff
(74) *Attorney, Agent, or Firm* — Baker Botts L.L.P.

(57) ABSTRACT

An automatic cooking medium level control system for a cooking apparatus, e.g., a fryer, may include a cooking vessel having a first temperature sensor at a first level of the cooking vessel and a second temperature sensor at a second level of the cooking vessel. A reservoir holding a cooking medium, such as cooking oil, may be in fluid communication with the cooking vessel. A controller may monitor temperature data from the first and second temperature sensors to determine whether the level of cooking oil in the cooking vessel has lowered. Upon determining that the cooking oil level has lowered, the controller may actuate a supply mechanism, such as a pump, which may be disposed on a fluid communication path between the reservoir and cooking vessel, which may enable the introduction of cooking medium from the reservoir to the to the cooking vessel.

12 Claims, 8 Drawing Sheets

AUTOMATIC COOKING MEDIUM LEVEL CONTROL SYSTEMS AND METHODS

BACKGROUND OF THE INVENTION

1. Field of the Invention

The present invention relates generally to systems and methods for automatic cooking medium control in the well of a cooking apparatus, such as a fryer.

2. Description of Related Art

Known fryers, e.g., open-well fryers and pressure fryers, are used to cook various food products, e.g., poultry, fish, or potato products. Such fryers include a cooking vessel, e.g., a frypot, and the cooking vessel is filled with a cooking medium, e.g., an oil, a liquid shortening, or a meltable-solid shortening. Such fryers also include a heating element, e.g., an electrical heating element, such as a heating coil, or a gas heating element, such as a gas burner and gas conveying tubes, which heat the cooking medium in the cooking vessel. After the cooking medium reaches a preset cooking temperature, the food product is placed into the cooking medium, such that the food product is cooked in the cooking medium. For example, the food product may be positioned inside a product holder, e.g., a wire basket, and submerged in the cooking medium for a predetermined amount of time sufficient to cook or to complete the cooking of the food product. The amount of time sufficient to cook or to complete the cooking of the food product at a given cooking temperature depends on the type of food product which is cooked. Moreover, the cooking medium is used during several cooking cycles before the cooking medium inside the cooking vessel is filtered, replaced, or supplemented with a new or filtered supply of cooking medium.

The cooking medium in an open-well or pressure fryer is maintained at a proper level to standardize or to optimize cooking performance, or both. During each cooking cycle, however, the food product may absorb a small amount of cooking medium during cooking. In addition, a quantity of cooking medium also may evaporate or spill out of the cooking vessel during. Consequently, the level of cooking medium in the cooking vessel may decline or lower over repeated cooking cycles. As a result, the surface of the food product, or the entire food product, may not be fully submerged in the cooking medium when the product holder is positioned within the cooking vessel. This may result in uneven and inconsistent cooking results that reduce the quality of the cooked food product. For example, food product may be undercooked because it is not fully submerged in the cooking medium. Unappealing color variations in cooked food product also may result from temperature variation caused by the food product being exposed alternatively to both the air and cooking medium during the cooking process. Accordingly, it is desirable to maintain an adequate level of cooking medium in the vessel for maintaining cooking quality.

During busy periods, such as the so-called "lunch rush," it may be difficult for a fryer operator to continuously monitor the level of cooking medium. If a fryer operator notices a reduced level of cooking medium, the operator manually adds cooking medium to the cooking vessel and allows the just-added cooking medium to reach a cooking temperature and consistency before using the fryer again. Thus, the ability to maintain an adequate level of cooking medium depends largely upon the attentiveness and skill of the operator.

Most known level sensing methods, however, are not entirely suitable for use in a cooking vessel, such as a frypot. Float switches, for example, may be fragile and may fail if cooking by-product contaminates the float or float hinge. In addition, such switches often are difficult to clean and take up a significant portion of the cooking vessel's volume. Optical sensors similarly may fail due to contamination from cooking by-product. Further, optical sensors may give false readings caused by reflections from nearby cooking screens or product holders. Capacitive sensors may take up a significant amount of surface area on the cooking vessel surface and must be located in close proximity with one another, which may lead to false readings and makes these sensors difficult to clean. Ultrasonic sensors may be expensive, particularly at the resolution used for monitoring cooking medium in a cooking vessel, and also may be affected by reflections from product holders.

SUMMARY OF THE INVENTION

Therefore, a need has arisen for a fryer apparatus that overcome these and other shortcomings of the related art. A technical advantage of the present invention is that a fryer may comprise an automatic cooking medium control system, such that the level of cooking medium may be maintained automatically without any action required by the fryer operator. Another technical advantage of the invention is that the automatic cooking medium control system may use a plurality of temperature sensors at a level just below cooking medium fill line to prevent complete system failures or the occurrence of false indications caused by variations in the cooking medium temperature, or both. Yet another technical advantage of the present invention provides is that a method of automatically maintaining the cooking medium level may comprise a degree of hysteresis that prevents overcycling of the supply mechanism, such as a pump, that adds cooking medium to the fryer to maintain an adequate level of cooking medium. Still another technical advantage of the invention, the automatic cooking medium control system further may comprise a heating element that preheats a viscous cooking medium to make it less viscous, which enables the use of a less expensive supply mechanism by virtue of being more energy efficient or less powerful, or both. Moreover, preheating the cooking medium results in better temperature regulation by reducing the temperature reduction of the cooking medium in the vessel heated to a cooking temperature caused when the newly introduced cooking medium is mixed with the cooking medium already in the fryer.

The systems and methods of the invention are suitable for use with an automated one-touch filtering system, such as the one disclosed in U.S. patent application Ser. No. 11/563,597, entitled "ONE-TOUCH FILTERING SYSTEMS AND METHODS," the disclosure of which is hereby incorporated by reference in its entirety.

According to an embodiment of the present invention, an automatic cooking medium control system may comprise a cooking vessel including an opening for receiving food product, a plurality of temperature sensors providing temperature data, a reservoir of a cooking medium in fluid communication with said cooking vessel, and a supply mechanism disposed on a fluid communication path between the reservoir and at an inlet to the cooking vessel. The plurality of temperature sensors may comprise a first temperature sensor at a first level of the cooking vessel, and a second temperature sensor at a second level of said cooking vessel. The automatic cooking medium control system may further comprises a controlling mechanism that receives temperature data from the plurality of temperature sensors. In response to the temperature data, the controlling mechanism actuates the supply mechanism to provide the cooking medium from the reservoir to the cooking vessel.

According to another embodiment of the present invention, a method for automatically maintaining a level of cooking medium in a cooking vessel may comprise detecting temperature data of the cooking vessel, comparing the temperature data, determining a level of cooking medium in the cooking vessel based on the compared temperature data, and adding an amount of cooking medium to the cooking vessel upon determining that the level of cooking medium is inadequate. Detecting the cooking vessel temperature data may comprise detecting first temperature data at a first level of the cooking vessel, and detecting second temperature data at a second level of the cooking vessel that is below the first level. Also, the comparing step may comprise comparing the first temperature data with the second temperature data.

According to yet another embodiment of the invention, an automatic cooking medium control system may comprise a cooking vessel and a temperature sensing means for providing temperature data, e.g., a resistor temperature detector ("RTD"). The temperature sensing means may comprises a first temperature sensing means at a first level of said cooking vessel, and a second temperature sensing means at a second level of said cooking vessel. The system also may comprise a reservoir of a cooking medium in fluid communication with the cooking vessel; and a supply means for supplying a quantity of cooking medium from said reservoir to said cooking vessel, e.g., a pump. Moreover, the system may comprise a controlling means for actuating said supply means in response to the temperature data, e.g., a microprocessor associated with a physical memory.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

Preferred embodiments of the present invention, and their features and advantages, may be understood by referring to FIGS. 1-8, like numerals being used for corresponding parts in the various drawings.

Figure 1:
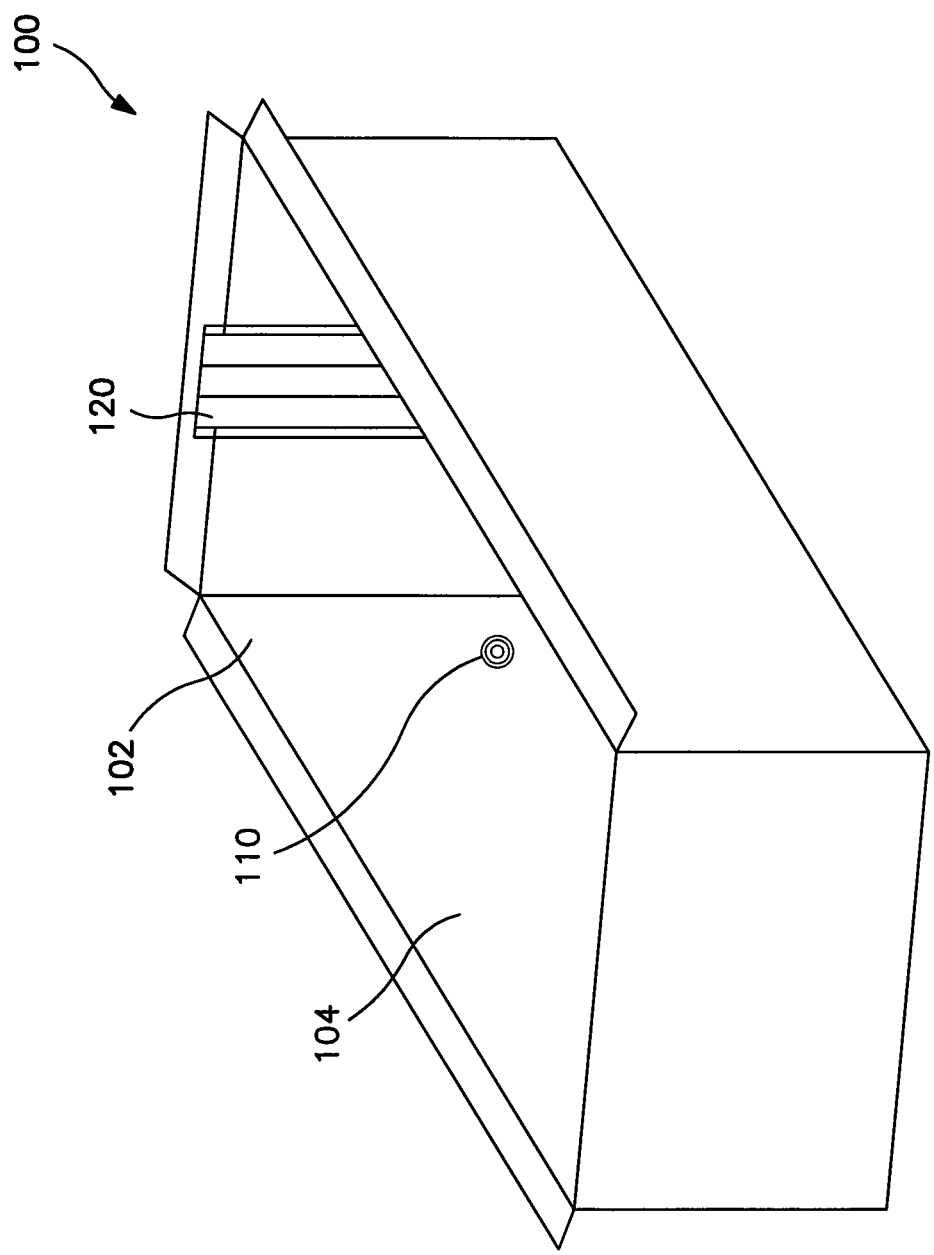
FIG. 1 is a perspective view of a fryer apparatus, according to an embodiment of the present invention.
Figure 2:
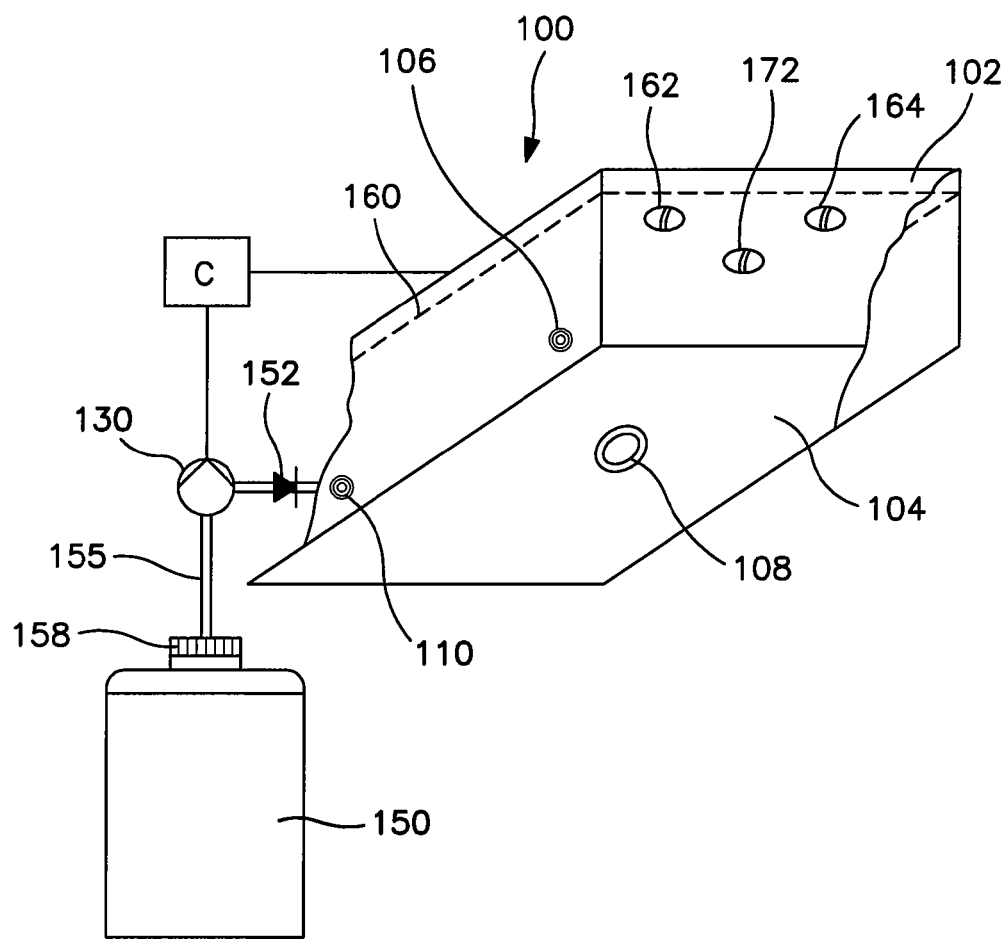
FIG. 2 is a cutaway perspective view of the fryer apparatus of FIG. 1, according to an embodiment of the present invention.

Referring to FIGS. 1 and 2, a fryer apparatus 100 according to an embodiment of the present invention is depicted. Fryer apparatus 100 may comprise at least one cooking vessel 104, e.g., a frypot, which may be configured to hold a cooking medium, e.g., an oil, a liquid shortening, a meltable-solid shortening, water, or the like. Fryer apparatus 100 may include an opening 102 formed in cooking vessel 104 for receiving a food product. Disposed within cooking vessel 104 is a heating element 120, which may be a heating coil, for heating the cooking medium disposed within cooking vessel 104. Fryer apparatus 100 may be a gas or electric fryer. FIGS. 1 and 2 depict an open-well fryer as fryer apparatus 100, but a pressure fryer also may be used.

Cooking vessel 104 may comprise an inlet 106 and a drain 108 for connecting to a system for filtering the cooking medium (not shown), such as the one described in U.S. patent application Ser. No. 11/563,597. Cooking vessel 104 may further comprise a supply inlet 110 in fluid communication with cooking medium reservoir 150 via a supply line 155. A predetermined fill line 160 for a desired "full" cooking medium level may be disposed proximate to opening 102. At least one temperature sensor 162, 164 may be disposed at a first sensing level slightly below fill line 160. Preferably, the first sensing level is less than or equal to about 0.5 inches (about 1.27 cm) below the fill line 160, and more preferably, about 0.1 inches (about 0.25 cm) to about 0.5 inches (about 1.27 cm) below fill line 160. A temperature sensor 172 may be disposed at a second sensing level that is further from opening 102 than the first sensing level. Any temperature sensors suitable for use in an operational cooking vessel may be used, but resistor temperatures detectors ("RTDs") are shown here. The RTDs may be platinum thin-film RTDs sheathed in stainless steel, which provides a relatively inexpensive, durable temperature sensor having an outer surface that is readily cleanable.

Reservoir 150 may be filled with a cooking medium as a source for replenishing cooking medium in cooking vessel 104. Reservoir 150 may comprise a fill cap assembly 158 providing an interface between reservoir 150 and supply line 155. Fill cap assembly 158 may be removably couplable to reservoir 150 via, e.g., a quick release, a snap assembly, or a threaded connection. A supply mechanism, e.g., pump 130, may be disposed on supply line 155 to draw the cooking medium from reservoir 150 to vessel 104. A valve 152 also may be disposed on supply line 155 proximate to supply inlet 110 to prevent cooking medium within vessel 104 draining towards reservoir 150. Preferably, the supply inlet may be located proximate to a bottom surface of vessel 104, so that the lower temperature cooking medium supplied via supply line 155 does not adversely affect the temperature of the cooking medium proximate to temperature sensor 172. The cooking medium in vessel 104 may be contaminated with cooking by-product, and it is desirable to keep the cooking medium within reservoir 150 and supply line 155 as clean, as possible. Here, valve 152 is depicted as a one-way check-valve, but any suitable valve may be used, e.g., a solenoid actuated valve. A single reservoir may be coupled to a plurality of cooking vessels, wherein each cooking vessel may have a dedicated supply mechanism, e.g., a pump or solenoid valve controlled by a control mechanism C, to regulate an amount of cooking medium supplied by the single reservoir.

Control mechanism C may be coupled to pump 130 and temperatures sensors 162, 164, 174 (coupling not shown). Control mechanism C may comprises a microprocessor having a physical memory that acts a comparator to compare temperature data detected at the first and second sensing level. Control mechanism C also may comprise a controller that transmits a control signal to pump 130 based on the comparison of the detected temperature data. Moreover, the controller may transmit a control signal to valve 152, if the valve is an electrically actuated valve, e.g., a solenoid actuated valve.

Figure 3A:
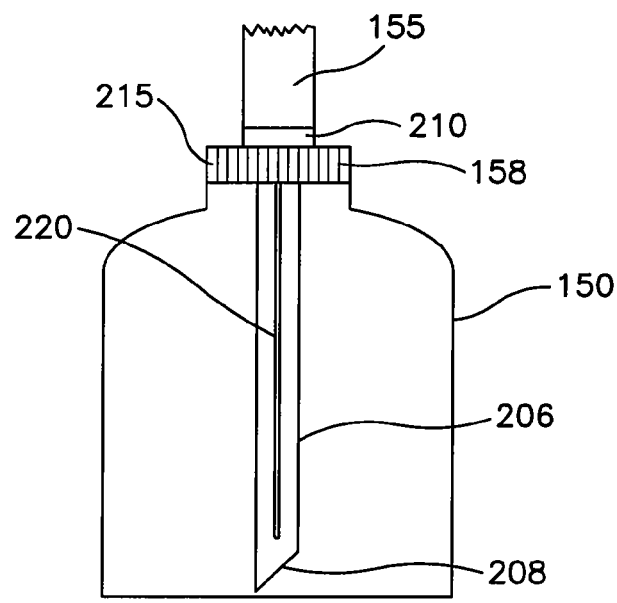
FIG. 3A is a cross-sectional view of a cooking medium reservoir, according to an embodiment of the present invention.

Referring to FIG. 3A, a cooking medium reservoir 150 according to an embodiment of the present invention is depicted. Reservoir 150 may comprise a fill cap assembly 158, which may comprise a cap 215 which fits over a reservoir opening, a fill tube 206 which extends the height of the reservoir, and a fitting 210 mounted to cap 215 removably couplable to reservoir 150 at an opening thereof. Fitting 210 may connect to a hose or pipe serving a supply line 155 that leads to pump 130. Fill tube 206 may extend nearly to a surface of the reservoir opposite the opening, e.g., a bottom surface, so that substantially all of the cooking medium may be removed from reservoir 150. An inlet 208 of fill tube 206 is angled, so that the pump suction does not cause tube 206 to seal to the bottom surface of reservoir 150. A heater 220 may be disposed within or surround fill tube 206 to preheat the cooking medium. Preheating the cooking medium may reduce its viscosity, which permits the use of a less powerful or more energy efficient pump, and, thus, a relatively less expensive pump, and may provide improved regulation of the cooking medium temperature in the vessel 104 by reducing or eliminating the temperature difference between the cooking medium supplied from reservoir 150 and the cooking medium already disposed within vessel 104.

Control mechanism C may monitor the amount of cooking medium dispensed from reservoir 150 to determine when reservoir 150 is substantially empty or otherwise requires replacement. Control mechanism C may measure the fill time. If the fill time exceeds a predetermined value $T_{FILL}$, control mechanism C may determine that reservoir 150 needs replacing, and a replacement alert may be provided via an audible alarm, a visual alarm, or both. A variety of schemes may be used to determine $T_{FILL}$, but an upper limit may be set by the time required to fill vessel 104 from fill line 160 to a top edge at opening 102. By setting $T_{FILL}$ in this manner, overflow of vessel 104 by cooking medium supplied from reservoir 150 is prevented, if the level detection system fails in some unanticipated way. Alternatively, a spring-loaded platform (not shown), strain gage (not shown), or other similar device, may be used to measure the weight of reservoir 150, and this measurement may be used to determine when to replace reservoir 150. Other level sensing mechanisms, such as the one described above that are not suitable for use in a cooking vessel, also may be suitable for monitoring the level of cooking medium in reservoir 150.

Figure 3B:
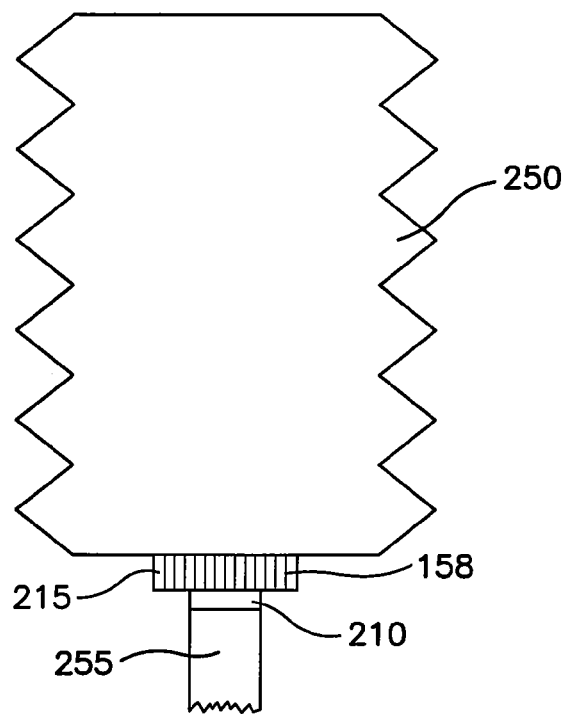
FIG. 3B is a cross-sectional view of a cooking medium reservoir, according to another embodiment of the present invention.

Referring to FIG. 3B, a cooking medium reservoir 250 according to another embodiment of the present invention is depicted. Cooking medium reservoir 250 may be a collapsible reservoir having an accordion-like structure. Reservoir 250 may use gravity, as depicted here, to feed cooking medium to towards a supply line 255. A fill tube may be omitted from a gravity-feed reservoir 250. Moreover, a pump may be omitted and valve 152 may be a solenoid-actuated valve controlled by control mechanism C to resupply cooking medium from reservoir 250. Further, a heater (not shown) may be disposed on or proximate to fill cap assembly 158 at an opening of reservoir 250 to preheat the cooking medium.

Figure 4:
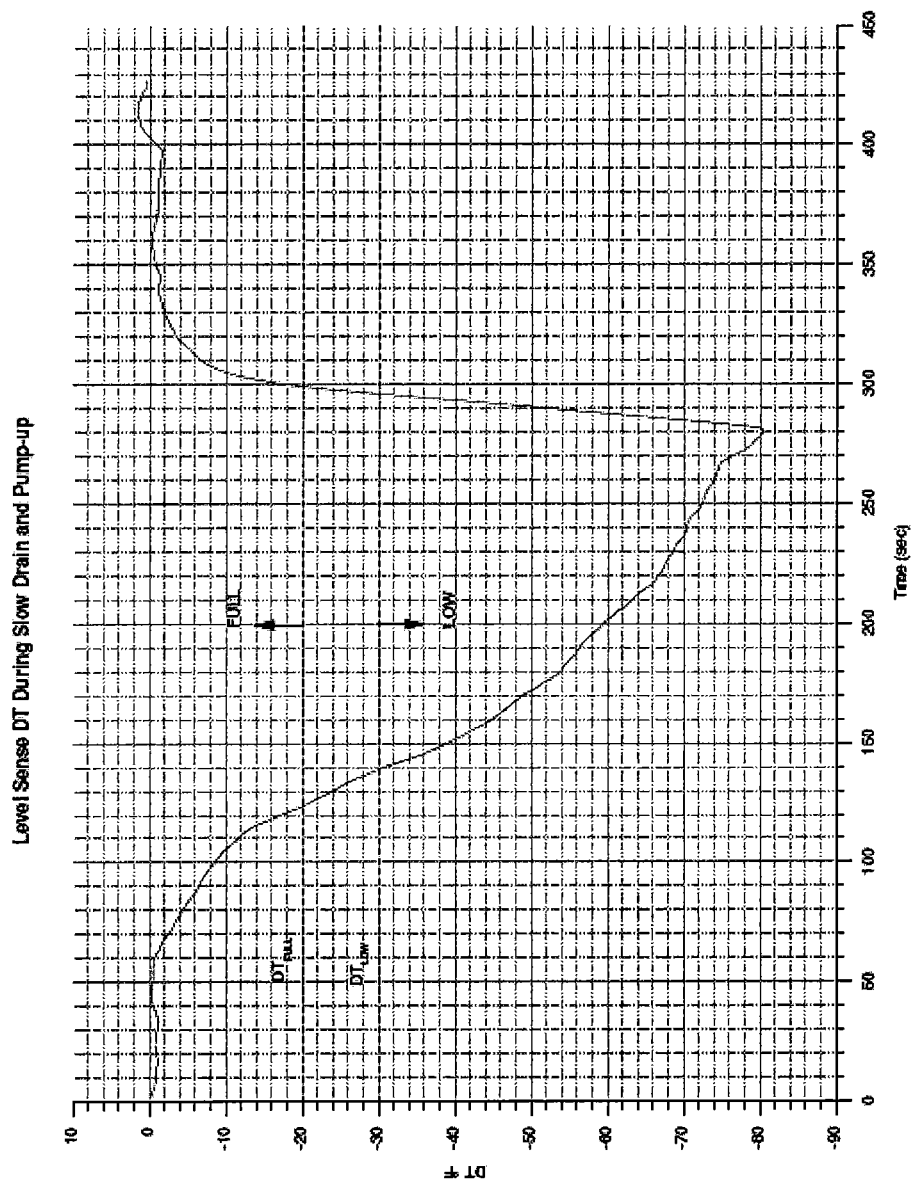
FIG. 4 is a graph depicting changes in temperature of a cooking medium in a fryer apparatus as a function of time in a fryer apparatus, according to an embodiment of the invention.

Referring to FIG. 4, a reduction in the cooking medium level of vessel 104 may be determined by comparing the detected temperature data at the first and second sensing levels. As the cooking medium level lowers, temperature sensors 162, 164 may become uncovered by the cooking medium or otherwise exposed to air. On the other hand, temperature sensor 172 may remain submerged in the cooking medium. Bottom temperature sensor 172 may be dedicated to this level sensing function. To reduce the cost and complexity of the system, however, bottom temperature sensor 172 may serve as the temperature sensor already used for regulating the cooking medium temperature. As the difference between the temperatures sensed at the first and second sensing levels increases, control mechanism C may determine that the cooking medium level has declined to a level that adversely may affect the cooking performance of fryer apparatus 100.

Temperature sensors 162, 164, 172 continually may take a plurality of temperature readings concurrently. Each group of concurrent temperature readings may be compared by the following equation 1:

$$DT = T_1 - T_2 \qquad \text{(Equation 1)},$$

$T_1$ is the temperature detected at the temperature sensors 162, 164 at the first level, $T_2$ is the temperature detected at the temperature sensor 172 at the second level, and DT is the temperature difference. DT is a negative number that reflects a reduction or decrease in temperature between the first level to the second level. $T_1$ may be an average of the temperatures detected at sensors 162, 164, or each $T_1$ reading at sensors 162, 164 may be compared individually with the concurrent $T_2$ reading. Preferably, the compared temperature readings from sensors 162, 162, 174 are substantially contemporaneous.

A predetermined number (n) of temperature readings then may be compared in a plurality of ways to determine whether the temperature difference, i.e., a reduction in temperature, is low, e.g., less than or equal to $DT_{FULL}$, which indicates that the cooking medium level in vessel 104 is adequate, or whether the temperature difference is high, e.g., less than or equal to $DT_{LOW}$, which indicates that the cooking medium level is inadequate.

Referring to FIG. 4, $DT_{FULL}$ and $DT_{LOW}$, are predetermined temperature value thresholds, which may be determined empirically. FIG. 4 depicts $DT_{FULL}$ as about 20° F. (about 11.1° C.) and $DT_{LOW}$ as about 30° F. (about 16.7° C.). A hysteresis is provided between $DT_{FULL}$ and $DT_{LOW}$ so that false indications are not generated that may result in excessive cycling of pump 130, which may shorten the operational life of pump 130. FIG. 4 depicts a hysteresis of about 10° F. (about 5.6° C.). Any temperature difference DT between $DT_{FULL}$ and $DT_{LOW}$ thresholds may be categorized as indeterminate.

Control mechanism C may monitor the predetermined number (n) of temperature value thresholds to determine the adequacy of the cooking medium level in vessel 104 by Equation 2:

$$K > n/2 + 1 \qquad \text{(Equation 2)}.$$

K is a predetermined level value threshold and n is the number of temperature differences monitored, i.e., a queue (1 to n) temperature differences. As a result, the level of the cooking medium may be determined by the following rules:

If $K_{LOW} \geq K$, then the level is LOW;
Else if $K_{FULL} \geq K$, then the level is FULL.

$K_{LOW}$ is the number of $DT_{LOW}$ values in the queue of n monitored values and $K_{FULL}$ is the number of $DT_{FULL}$ values in the queue. Indeterminate values may be monitored or stored in the queue, such that they prevent the number of $DT_{FULL}$ or $DT_{LOW}$ values from reaching threshold K to effect a cooking medium level change to or from FULL to LOW. Moreover, the queue may be a first-in, first-out queue wherein the oldest measured difference $DT_n$ is replaced in the queue by the most recently measured difference $DT_1$. Accordingly, an additional degree of hysteresis may be provided by requiring a majority of monitored DT values indicate a level state before cooking medium is supplied to vessel 104. Referring to FIG. 4, the DT is about 80° F. (about 44.4° C.) when a LOW level, i.e., a start-fill level, of cooking medium is determined and control mechanism C signals pump 130 to cycle to supply cooking medium to vessel 104. As DT approaches 0° F. (0° C.), a FULL level, i.e., a stop-fill level, of cooking medium is determined, and control mechanism C signals pump 130 to shut off to prevent overfilling of vessel 140 with cooking medium.

Alternatively, control mechanism C may signal pump 130 to supply cooking medium to vessel 104 for a predetermined supply time period upon a determination of a LOW cooking medium level and then shut off for a predetermined rest time period. For example, pump 130 may supply cooking medium for six (6) seconds, and then be shut off for 54 seconds. If the cooking medium level state is determined to be LOW after the rest period, control mechanism C again signals pump 130 to supply cooking medium for six (6) second time period. If the cooking medium level state is determined to be FULL after the rest period, control mechanism C does not send a control signal and pump 130 will remain shut off. Such a configuration of control mechanism C may reduce or eliminate overfilling of vessel 104.

Temperature sensors 162, 164 can work in conjunction with or separately from one another. For example, if n=10, the queue may comprise five (5) compared temperatures readings between sensor 162 and 172 and five (5) compared temperatures reading between sensor 164 and 172. Alternatively, T1 may be an average of the readings from sensors 162, 164. Finally, each sensor may have a separate queue, such that the compared temperatures readings between sensor 162 and 172 comprise a first queue n, and the compared temperatures readings between sensor 164 and 172 may comprise a second queue n'. Another level of hysteresis may be provided by permitting actuation of pump 130 if only both n and n' indicate a LOW level of cooking medium.

Preferably, the cooking medium temperature is substantially above an ambient air temperature, otherwise the temperatures detected at the first and second sensing levels will be near the ambient air temperature whether or not covered with cooking medium. The cooking medium expands when heated, so accurate level control may be obtained by adjusting the level only when the cooking medium in vessel 104 is substantially at or above the cooking setpoint temperature, e.g., at least 250° F. (about 121.1° C.).

Figure 5:
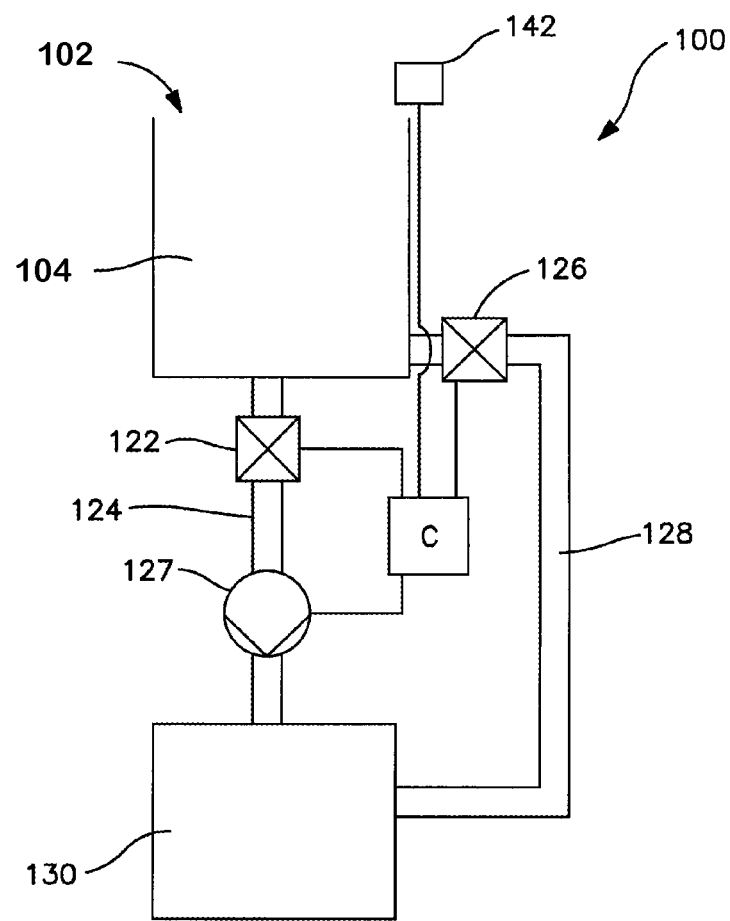
FIG. 5 is a schematic view of an automatic cooking medium filtering system according to an embodiment of the invention.

Referring to FIG. 5, a filtering system of a fryer apparatus 100 according to an embodiment of the present invention is depicted. Cooking vessel 104 may comprise a drain at an inlet of a drain path 124 fluidly connecting vessel 104 to a filter container 130, e.g., a drain pan or a filter canister. A drain valve 122, which may be a solenoid valve, may be disposed on drain path 124 to selectively permit cooking medium to drain from vessel 104 in response to a control signal from a controller C. Preferably, drain valve 122 is a linearly actuated valve to reduce the likelihood that cooking by-product may obstruct valve 122. Cooking medium may pass through filter container 130 and return to vessel 116 via a filter or a fill path 128. A second filter container (not shown) that may serve as a backup filter also may be connected to paths 124, 128, when a filter in container 130 requires replacing or otherwise malfunctions. A filter or a fill valve 126, which also may be a solenoid valve, may be disposed on filter path 124 to selectively permit cooking medium to be introduced into vessel 104 in response to a control signal from controller C.

Referring to FIG. 5, a pump 127 is disposed on drain path 124 to convey the cooking medium along drain and fill paths 124, 128, but pump 127 also may be disposed on fill path 128. Pump 127 actuates and de-actuates in response to a control signal from controller C. Controller C may comprise a processor coupled to a physical memory, an operator input, e.g., a push-button manual switch or an electronic switch, and a mechanism to detect whether the cooking medium is in suitable condition for filtering. Controller C may be coupled to an indicator 142, e.g., a visual or audible alarm that indicates either that a filtering process is being performed or that the cooking medium in vessel 104 is not in suitable condition for filtering. Indicator 142 may be a light, e.g., incandescent, fluorescent, LED, or the like, or indicator 142 may be incorporated into the fryer apparatus' current display, such as on an LCD screen. If indicator 142 is an LED light, it may be on to indicate filtering of the cooking medium, and may blink to indicate the cooking medium is not suitable, i.e., not ready for, filtering.

Drain and fill manifolds (not shown) may be disposed on the respective drain and fill paths, such an arrangement may permit the use of a smaller filter container that has an insufficient capacity to hold the entire volume of cooking medium within vessel 104, or may allow multiple vessels to be connected to the same filter container wherein a multiple vessel, fryer apparatus may use a single filtering system, as shown, for example, in FIG. 5.

Figure 6A:
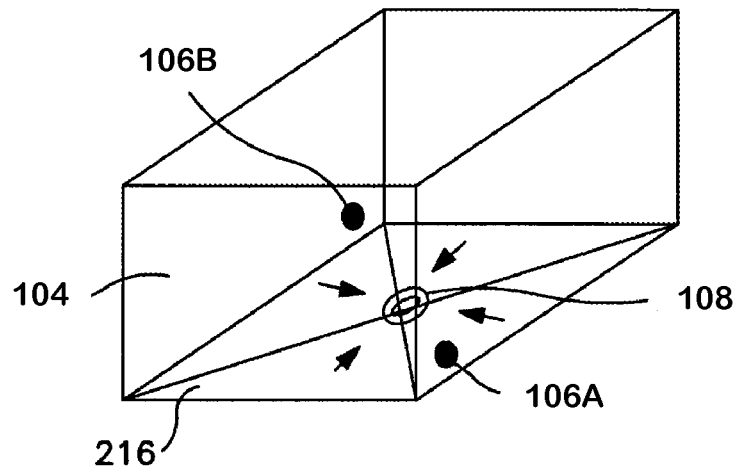
FIG. 6A is a perspective view of a cooking vessel according to an embodiment of the invention.
Figure 6B:
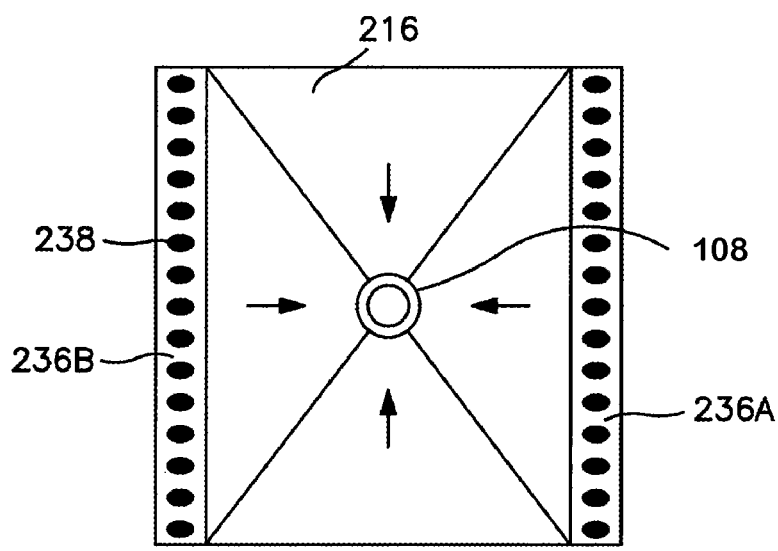
FIG. 6B is a plan view of a cooking vessel according to another embodiment of the invention.

Referring to FIG. 6A and FIG. 6B, arrangements for cooking medium inlets fluidly connected to filter path 128 according to embodiments of the invention are depicted. As shown in FIG. 4A, a pair of inlets 106A, 106B may be formed within a surface of cooking vessel 104 disposed at opposite ends of a longitudinal axis, i.e., a length, of vessel 104. For example, here inlets 106A, 106B are shown as formed within opposing sidewalls of vessel 104. Inlets 106A, 106B may be separated by a lateral distance that is substantially a width of vessel 104. Arranging inlets 106A, 106B in this configuration may facilitate "swirling" of the cooking medium on a bottom surface 216 of vessel 104 to clean bottom surface 216, wherein cooking by-product or any other particles may exit vessel 104 through drain 108. Bottom surface 216 may be sloped towards drain 108 to assist cooking medium, and any cooking by-product therein, to exit vessel 104. Preferably, inlets 106A, 106B are disposed proximate bottom surface 216.

Referring to FIG. 4B, an alternative inlet arrangement is depicted. A pair of linear diffuser headers 236A, 236B may extend along opposing sides of bottom surface 216. Diffuser headers 236A, 236B also may be disposed on opposing sidewalls of vessel 104 proximate to the bottom surface 216. Preferably, diffuser headers 236A, 236B extend substantially parallel to a longitudinal axis, i.e., along a length, of vessel 116. Diffuser headers 236A, 236B may comprise a plurality of inlet holes 238 for introducing cooking medium via filter path 128. Preferably, inlet holes 238 are configured to direct cooking medium towards a center axis of bottom surface 216 to promote the swirling of cooking medium for the reasons described above. Again, bottom surface 216 may be sloped towards drain 108.

Figure 7:
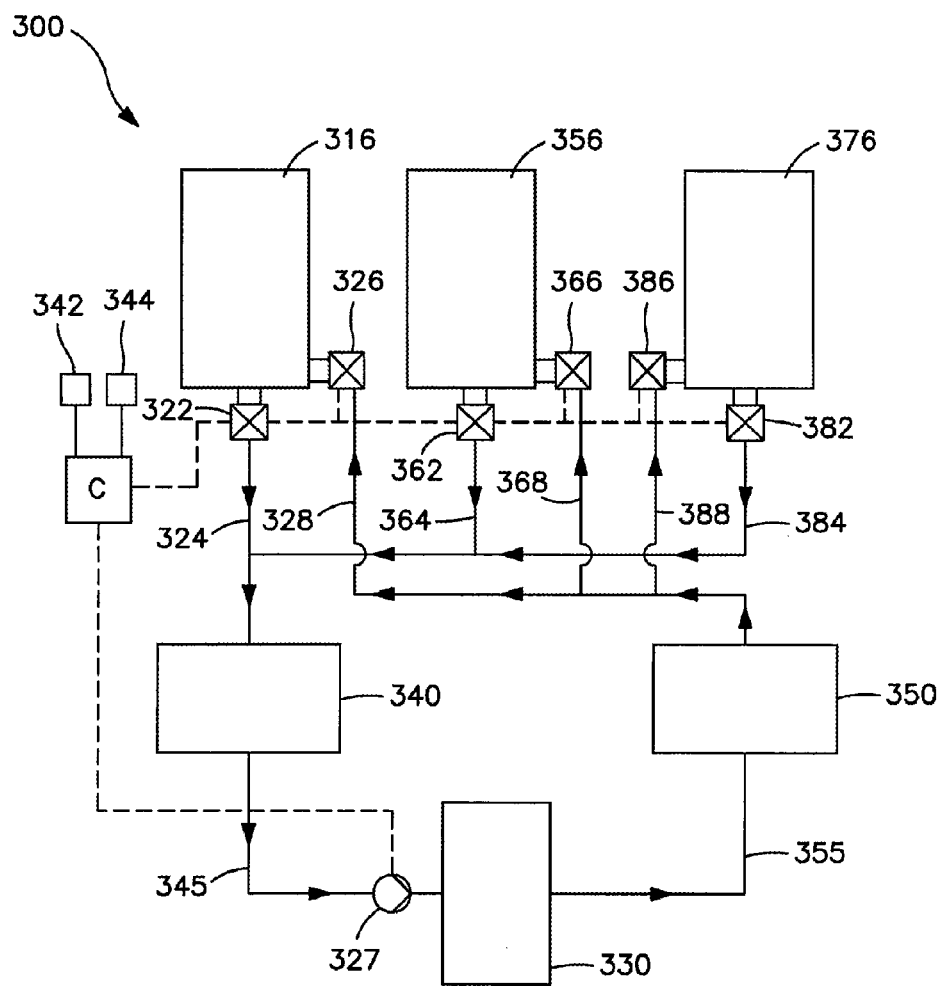
FIG. 7 is a schematic view of an automatic cooking medium filtering system according to another embodiment of the invention

Referring to FIG. 7, a filtering system 300 according to another embodiment of the present invention is depicted. A filtering system may comprises a plurality of cooking vessels 316, 356, 376, e.g., frypots. Each vessel 316, 356, 376 may comprise a drain path 324, 364, 384 fluidly connected to a common, drain manifold 340. If two vessels, e.g., vessels 316 and 356, are designated for a same first food product, and the third vessel, e.g., vessel 376, is designated for a different second food product, then vessels 316, 356 may be fluidly connected to a first drain manifold, while vessel 376 may be fluidly connected to a second drain manifold to segregate further the flavors infused in the cooking mediums for the respective first and second food products. A drain valve 322, 362, 382 responsive to a control signal from controller C may be disposed in each drain path 324, 364, 384.

Drain manifold 340 may be connected fluidly to filter container 330 on a manifold drain path 345. An outlet (not shown) a filter container 330 may be fluidly connected to a filter or a fill manifold 350 through a manifold filter or fill path 355. A pump 327 may be disposed on either manifold path 345, 355 to draw cooking medium through filter container 330. Here, pump 327, which may be responsive to a control signal from controller C, is shown as disposed on manifold drain path 345. Filter manifold 350 may be fluidly connected to each vessel 316, 356, 376 via a respective filter path 328, 368, 388. A filter valve 326, 366, 386 responsive to a control signal from controller C may be disposed on each filter path 326, 366, 386.

Controller C may be actuated by an operator using a single switch 344, e.g., a mechanical or an electronic switch. An indicator 342 coupled to controller C may give a visual or audible indication that filtering of cooking medium from at least one vessel 316, 356, 376 is being performed, or that the cooking medium in at least one of the vessels is not suitable, i.e., not ready, for filtering. Indicator 342 may also indicate that the cooking medium needs filtering, such indication may be based on a predetermined number of cooking cycles for which the cooking medium has been used or sensing the condition of the cooking medium to determine that it is no longer suitable or efficient for cooking food product.

Figure 8:
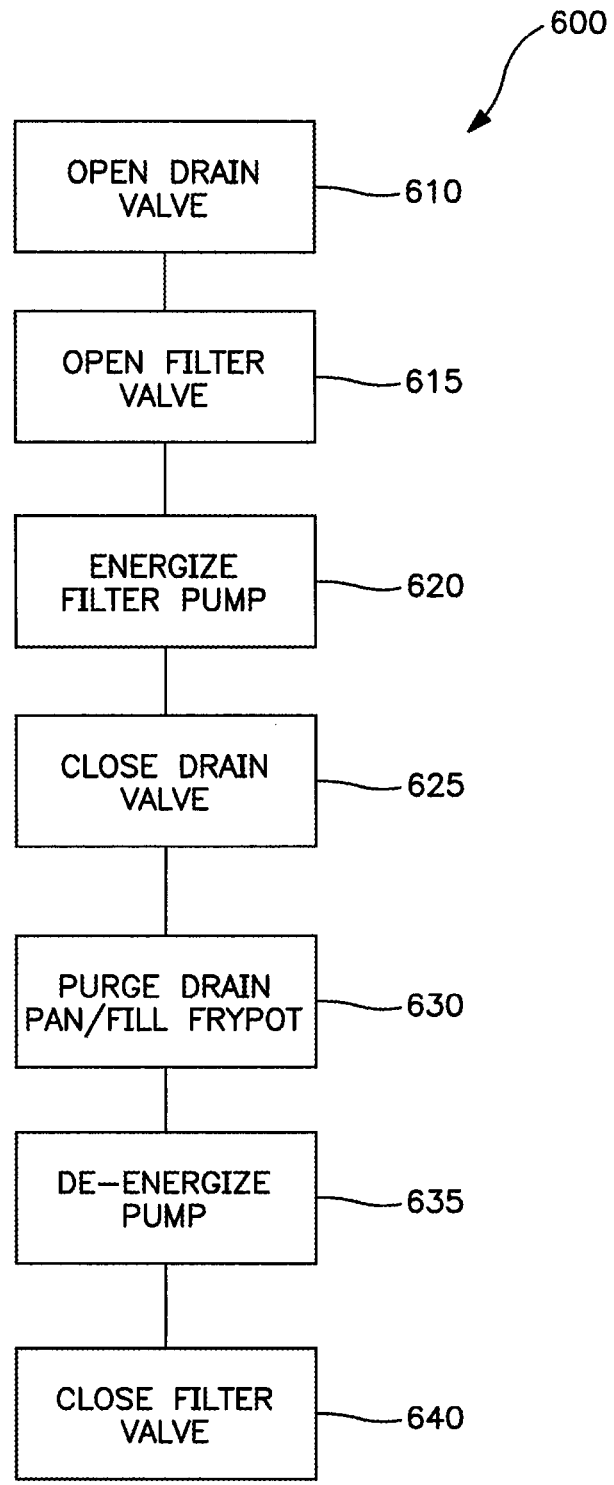
FIG. 8 is a flow chart showing a method for automatically filtering a cooking medium according to an embodiment of the invention.

Referring to FIG. 8, a method for automatically filtering a cooking medium of a cooking vessel, e.g., a frypot, is depicted. First, the operator may request the cooking medium in a cooking vessel to be filtered, e.g., by actuating a switch. Next, a controller may determine whether the cooking medium in the vessel is suitable, i.e., ready, for filtering. Parameters used for determining whether the cooking medium is ready for filtering may include, but are not limited to, the temperature of the cooking medium, any turbulence detected in the cooking medium, or whether food product is within the vessel. Further, if the method is used with a fryer apparatus having a plurality of cooking vessels, not more than one vessel may be suitable for filtering at any time, so that multiple vessels will not be filtered concurrently, in part, to prevent mixing of a significant amount of cooking medium from different vessels. Once it is determined that the cooking medium is suitable for filtering, then filtering of the cooking medium may begin.

Referring to FIG. 8, a method 600 for automatically filtering the cooking medium according to one embodiment of the invention is depicted. First, in step 610, a drain valve may be automatically opened to permit cooking medium to exit, or drain, the cooking vessel. Next, in step 615, a filter valve may be automatically opened to permit introduction of cooking medium into the vessel. Subsequently, a filter pump may be energized in step 620 to pass the cooking medium through a container, such as a drain pan or filter canister, to filter the cooking medium. Both the drain valve and the filter valve may be open concurrently when the pump is energized to enable a flow of cooking medium to coat or swirl on a bottom surface of the cooking vessel for cleaning purposes. After letting the cooking medium "clean" the bottom surface of the vessel for a predetermined period, the drain valve may be closed automatically in step 625 to allow purging of the filter container and filling of the vessel with cooking medium in step 630. Next, the pump may be de-energized in step 635 after filling the vessel. Finally, the filter valve may be closed automatically in step 640 to prevent drainage of cooking medium into the filter container and complete the filtering of cooking medium from the cooking vessel.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A method for automatically maintaining a level of cooking medium in a cooking vessel, the method comprising the steps of:
    heating the cooking medium in the cooking vessel to a predetermined temperature for cooking a food product;
    detecting temperature data within the cooking vessel when cooking the food product therein, comprising the substeps of:
        detecting first temperature data at a first level within the cooking vessel by making a plurality of first temperature readings at the first level, and
        detecting second temperature data at a second level within the cooking vessel, which is below the first level, by making a plurality of second temperature readings at the second level,
        wherein each of the plurality of second temperature readings corresponds to one of the plurality of first temperature readings taken substantially contemporaneously therewith;
    comparing the first temperature data and the second temperature data by comparing each of the first temperature readings with each of the corresponding second temperature readings;
    determining a level of cooking medium in the cooking vessel based on the comparison of the first and second temperature data, the step of determining the level of cooking medium in the cooking vessel comprising the substeps of:
        determining that a cooking medium level is at a start-fill value when the difference between a pair of substantially contemporaneous first and second temperature readings is greater than a predetermined start-fill value threshold, and
        determining that the level of cooking medium in the cooking vessel is inadequate when a number of start-fill values equals or is greater than a majority of a number of the comparisons of the first and second temperature readings;

adding an amount of cooking medium in the cooking vessel through at least one inlet along a first communication path upon determining that the level of cooking medium in the cooking vessel is inadequate, the step of adding cooking medium comprising the substeps of:
  adding the cooking medium at a third level within the cooking vessel that is below the second level within the cooking vessel, and
  adding the amount of cooking medium to be less than an amount that would exceed the capacity of the cooking vessel;
determining a fill time, which corresponds to an amount of time elapsed while adding the amount of cooking medium in the cooking vessel;
notifying a status of a source of the cooking medium added to the cooking vessel when the fill time exceeds a predetermined value; and
filtering cooking medium, the step of filtering cooking medium comprising the substeps of:
  causing cooking medium to exit the cooking vessel through at least one outlet along a second fluid communication path,
  filtering the cooking medium exited from the cooking vessel through said at least one outlet, and
  supplying filtered cooking medium to the cooking vessel through said at least one inlet along said second communication path.

2. The method of claim 1, wherein the determining step further comprises:
  determining that the cooking medium level is a stop-fill value when the difference between the substantially contemporaneous first and second temperature readings is less than a predetermined stop-fill level threshold;
  determining that the cooking medium level is indeterminate when the difference between the substantially contemporaneous first and second temperature readings is less than or equal to a predetermined start-fill level threshold and greater than or equal to a predetermined stop-fill level threshold; and
  determining that the level of cooking medium in the cooking vessel is inadequate when a number of start-fill values equals or is greater than a majority of the number of the comparisons of the first and second temperature readings less a number of determinations that the cooking medium level is indeterminate,
  wherein the predetermined start-fill level threshold is less than or equal to the predetermined stop-fill level threshold.

3. The method of claim 2, wherein the adding step is performed when the temperature of the cooking medium is greater than or equal to a predetermined cooking set point.

4. The method of claim 3, wherein the predetermined cooking set point is at least about 120° C.

5. The method of claim 2, further comprising heating the quantity cooking medium to be added to the cooking vessel.

6. The method of claim 5, wherein the replenishing step comprises the substep of pumping the quantity of heated cooking medium to be added to the cooking vessel.

7. The method of claim 1, wherein:
  the detecting first temperature data step further comprises the substep of making a plurality of third temperature readings at the first level;
  the comparing step further comprises comparing each of the third temperature readings with each of the corresponding second temperature readings, wherein each of the plurality of third temperature readings corresponds to one of the plurality of second temperature readings taken substantially contemporaneously therewith; and
  the determining step further comprises:
  determining that a cooking medium level is at a start-fill value when the difference between either a pair of substantially contemporaneous third and second temperature readings or the pair of substantially contemporaneous third and second temperature readings is greater than the predetermined start-fill value threshold, and
  determining that the level of cooking medium in the cooking vessel is inadequate when a number of start-fill values equals or is greater than a majority of a number of the comparisons of the third and second temperature readings.

8. The method of claim 7, wherein the determining step further comprises:
  determining that the cooking medium level is a stop-fill value when the difference between the substantially contemporaneous first and second temperature readings and the difference between the substantially contemporaneous third and second temperature readings is less than a predetermined stop-fill level threshold; and
  determining that the cooking medium level is indeterminate when the difference between the substantially contemporaneous first and second temperature readings and the difference between the substantially contemporaneous third and second temperature readings is less than or equal to a predetermined start-fill level threshold and greater than or equal to a predetermined stop-fill level threshold,
  determining that the level of cooking medium in the cooking vessel is inadequate when a number of start-fill values equals or is greater than a majority of the number of the comparisons of the third and second temperature readings less a number of determinations that the cooking medium level is indeterminate
  wherein the predetermined start-fill level threshold is less than or equal to the predetermined stop-fill level threshold.

9. The method of claim 1, wherein the adding step comprises adding the amount of cooking medium for a predetermined supply time period.

10. The method of claim 9, wherein the adding step comprises a predetermined rest time period, wherein the amount of cooking medium cannot be added to the cooking vessel during the predetermined rest time period.

11. The method of claim 10, wherein the supply time period is about six (6) seconds.

12. The method of claim 11, wherein the rest time period is about 54 seconds.

* * * * *